US010319359B2

(12) United States Patent
Molin et al.

(10) Patent No.: US 10,319,359 B2
(45) Date of Patent: Jun. 11, 2019

(54) METHOD FOR MASKING A SOUND SIGNAL GENERATED BY AN ELEMENT OF THE SKIN OF AN AIRCRAFT

(71) Applicant: Airbus Operations S.A.S., Toulouse (FR)

(72) Inventors: Nicolas Molin, Nailloux (FR); Isabelle Boullet, Toulouse (FR)

(73) Assignee: Airbus Operations S.A.S. (FR)

( * ) Notice: Subject to any disclaimer, the term of this patent is extended or adjusted under 35 U.S.C. 154(b) by 0 days.

(21) Appl. No.: 15/661,328

(22) Filed: Jul. 27, 2017

(65) Prior Publication Data
US 2018/0033418 A1 Feb. 1, 2018

(30) Foreign Application Priority Data

Aug. 1, 2016 (FR) .................................... 16 57470

(51) Int. Cl.
*H04R 3/04* (2006.01)
*B64C 23/06* (2006.01)
(Continued)

(52) U.S. Cl.
CPC ............ *G10K 11/175* (2013.01); *B64C 23/06* (2013.01); *G10K 11/161* (2013.01); *H04R 3/04* (2013.01);
(Continued)

(58) Field of Classification Search
CPC ..... B63C 11/202; G06F 3/016; G06F 3/0414; B64C 2025/003; B64C 2230/14; B64C 23/00; B64C 23/06; B64C 2220/00; G10K 11/161; G10K 11/175; G10K 11/172; G10K 2210/118; G10K 2210/129; H04R 3/04;
(Continued)

(56) References Cited

U.S. PATENT DOCUMENTS 6,234,751 B1 *  5/2001  Hassan ................. B64C 23/04
                                                                        244/130
2008/0145219 A1 *  6/2008  McVeigh ................. B64C 23/06
                                                                        416/23
(Continued)

FOREIGN PATENT DOCUMENTS

EP          2 692 632 A1    2/2014

OTHER PUBLICATIONS

FR 16 57470 Search Report dated Apr. 5, 2017.

*Primary Examiner* — Yogeshkumar Patel
(74) *Attorney, Agent, or Firm* — Lerner, David, Littenberg, Krumholz & Mentlik, LLP

(57) ABSTRACT

A masking method includes: a step of choosing a generating element which is part of the skin of an aircraft, a first step of measuring a fundamental frequency of a sound signal emitted by the generating element, a step of selecting a masking element which is part of the skin, a second step of measuring a fundamental frequency of another sound signal emitted by the masking element, a step of modification of the structure of the masking element in such a way as to shift the fundamental frequency of the sound signal emitted by the masking element to a frequency lower than the fundamental frequency of the sound signal emitted by the generating element. Such a masking method thus makes it possible to mask the sound signal emitted by the generating element by the sound signal emitted by the masking element.

8 Claims, 2 Drawing Sheets

(51) Int. Cl.
  *G10K 11/16* (2006.01)
  *H04R 29/00* (2006.01)
  *G10K 11/175* (2006.01)

(52) U.S. Cl.
  CPC ........ *H04R 29/001* (2013.01); *B64C 2220/00* (2013.01); *H04R 2499/13* (2013.01)

(58) Field of Classification Search
  CPC .............. H04R 29/001; H04R 2499/11; H04R 2499/13
  See application file for complete search history.

(56) References Cited

U.S. PATENT DOCUMENTS

| | | |
|---|---|---|
| 2008/0265102 A1 | 10/2008 | Larssen et al. |
| 2009/0084905 A1 | 4/2009 | Mau et al. |
| 2010/0122869 A1* | 5/2010 | Sengissen ............ B64C 23/005 181/264 |
| 2016/0229339 A1* | 8/2016 | Funayama ............ B60R 21/013 |

* cited by examiner

METHOD FOR MASKING A SOUND SIGNAL GENERATED BY AN ELEMENT OF THE SKIN OF AN AIRCRAFT

FIELD OF THE INVENTION

The present invention relates to a method for masking a sound signal generated, in an airflow, by an element of the skin of an aircraft, where the skin has at least one other element in the said airflow, and to an aircraft comprising a skin of which a structure of the other element has been modified by the implementation of the masking method.

BACKGROUND OF THE INVENTION

An aircraft comprises a skin which envelops the structure of the aircraft and which is in contact with the airflow in which the aircraft is moving. Such a skin has numerous elements which are also plunged into the airflow. These elements are for example cavities formed in the skin or additions such as for example antennas which then protrude.

Because of the airflow, these different elements generate sound signals, in particular whistling.

In the case of a cavity, these sound signals are due to the impact on the downstream edge of the cavity of the vortices which are generated at the upstream edge. At the location of this impact, a deceleration and a deformation of the vortices take place which create an acoustic wave and which gives rise:
  either to an oscillation of the fluid in the cavity which excites one of the modes of the cavity and the whistling frequency is then dictated by the shape of the cavity,
  or to a self-sustaining oscillation of the shear layer of the airflow which passes above the cavity since, at the time of the impact, the acoustic wave created goes back along the cavity and excites the vortices emitted at the upstream edge, and therefore the acoustic intensity at the upstream edge and so on.

In order to eliminate the sound signals thus generated, it is known to add devices which prevent the creation of the phenomena which induce the whistling. These devices are for example vortex generators installed upstream of the cavities or deflectors which shift the reattachment point beyond the cavity.

Even though these various solutions are satisfactory from the reduction of sound signals point of view, they necessitate the installation of devices on the skin and these devices add to the weight of the aircraft and potentially increase the drag of the aircraft.

BRIEF SUMMARY OF THE INVENTION

One aspect of the present invention is to propose a method for masking a sound signal generated, in an airflow, by an element of the skin of an aircraft.

There is proposed a masking method comprising:
  a choice step during which a generating element is chosen, the said generating element being part of the skin of an aircraft, and being in an airflow,
  a first measuring step during which a frequency meter measures a fundamental frequency of a sound signal emitted by the said generating element because of the said airflow,
  a selection step during which a masking element is selected from a plurality of possible masking elements, the said masking element being part of the skin and being in the airflow,
  a second measuring step during which a frequency meter measures a fundamental frequency of another sound signal emitted by the masking element because of the said airflow,
  a modification step during which
    either the structure of the masking element is modified in such a way as to shift the fundamental frequency of the sound signal emitted by the masking element to a frequency lower than the fundamental frequency of the sound signal emitted by the generating element,
    or the structure of the generating element is modified in such a way as to shift the fundamental frequency of the sound signal emitted by the generating element to a frequency higher than the fundamental frequency of the sound signal emitted by the masking element.

Such a masking method thus makes it possible to mask the sound signal emitted by the generating element by the signal emitted by the masking element.

According to a particular embodiment, the generating element is a cavity and the modification step consists of modifying the downstream edge of the cavity by transforming a protruding edge into a chamfer. The downstream chamfer will moreover reduce the intensity of the whistling of the generating element and favour the sound masking by the masking element.

According to another particular embodiment, the masking element is a cavity and the modification step consists of modifying the upstream edge of the cavity by transforming a protruding edge into a chamfer. The upstream chamfer will increase the intensity of the whistling of the masking element and favour the sound masking of the generating element.

According to another particular embodiment, the masking element is an area of the skin in the vicinity of the generating element and the modification step consists of attaching a bar onto the said area.

According to another particular embodiment, the masking element takes the form of an aerodynamic profile and the modification step consists of truncating the downstream edge of the masking element.

According to another particular embodiment, the masking element takes the form of an aerodynamic profile and the modification step consists of thickening the downstream edge of the masking element.

According to another particular embodiment, the masking element takes the form of an aerodynamic profile and the modification step consists of lengthening and thinning the downstream edge of the masking element.

The invention also proposes an aircraft comprising a skin in an airflow and having a generating element generating a sound signal because of the said airflow and a masking element generating another sound signal because of the said airflow, the said masking element and the said generating element being chosen and the structure of one or other of them being modified by the implementation of the masking method according to one of the above variants.

BRIEF DESCRIPTION OF THE DRAWINGS

The features of the invention mentioned above, as well as others, will appear more clearly on reading the following description of an example embodiment, the said description being given with reference to the appended drawings, among which.

DETAILED DESCRIPTION

Figure 1:
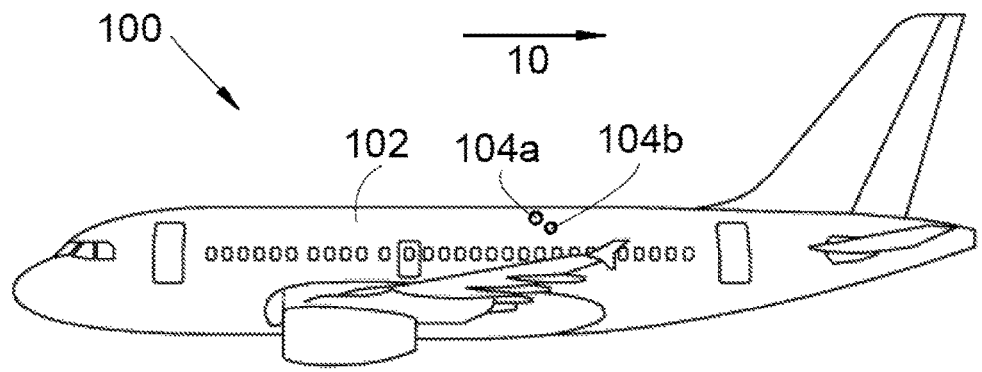
FIG. 1 shows a side view of an aircraft according to an embodiment of the invention.

FIG. 1 shows an aircraft 100 comprising a skin 102 which extends all around the aircraft 100. The aircraft 100 is moving in an airflow which is here symbolized by the arrow 10.

The skin 102 has a plurality of elements 104a-b which are also in the airflow 10 and which are for example cavities formed in the skin or additions such as for example antennas which then protrude. Each of these elements 104a-b generates a sound signal because of the airflow 10.

In the continuation of the description, the element referenced 104a is called the generating element 104a, that is to say it is the element generating the sound signal which must be masked, and the element referenced 104b is called the masking element, that is to say it is an element generating another sound signal for masking the sound signal generated by the generating element 104a.

The principle of the invention is not to eliminate the sound signal generated by the generating element 104a but to eliminate the acoustic unease felt by an observer when the aircraft passes by creating a new sound signal emitted by the masking element 104b and which is superimposed on the sound signal generated by the generating element 104a.

The principle of the invention is based on the functioning of the human ear. If fact, when there are two sound signals with close frequencies, the human ear has a tendency to perceive only the signal with the lowest frequency provided that its amplitude is sufficiently high.

Figure 8:
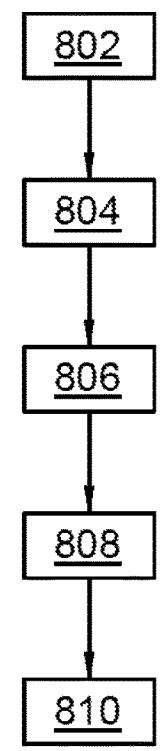
FIG. 8 shows a flowchart of a masking method according to the invention.

FIG. 8 shows a flowchart 800 of a masking method according to the invention. The masking method 800 comprises:
a choice step 802 during which a generating element 104a is chosen,
a first measuring step 804 during which a frequency meter measures a fundamental frequency of a sound signal emitted by the generating element 104a because of the airflow 10,
a selection step 806 during which a masking element 104b is selected from a plurality of possible masking elements 104b,
a second measuring step 808 during which a frequency meter measures a fundamental frequency of another sound signal emitted by the masking element 104b because of the said airflow 10,
a modification step 810 during which
either the structure of the masking element 104b is modified in such a way as to shift the fundamental frequency of the sound signal emitted by the masking element 104b to a frequency lower than the fundamental frequency of the sound signal emitted by the generating element 104a,
or the structure of the generating element 104a is modified in such a way as to shift the fundamental frequency of the sound signal generated by the generating element 104a to a frequency higher than the fundamental frequency of the sound signal emitted by the masking element 104b.

Thus, the sound signal emitted by the generating element 104a is covered by the sound signal emitted by the masking element 104b and an observer is then less auditorily disturbed.

The masking element 104b to be modified is chosen in the vicinity of the generating element 104a.

The structure of the masking element 104b is modified in such a way as to modify the aerodynamic flow around the masking element 104b.

Figure 2:
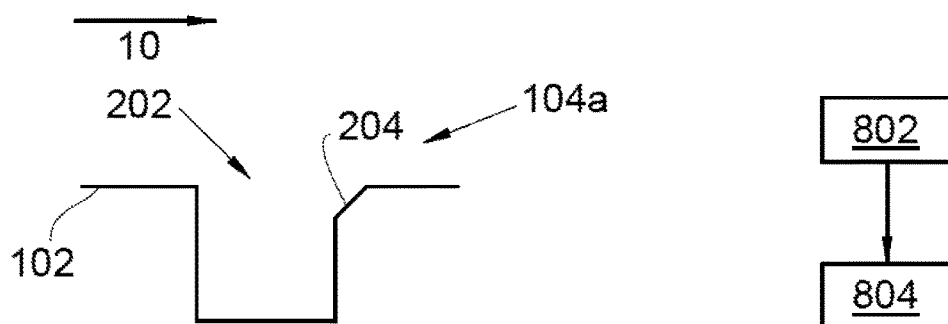
FIG. 2 shows the geometry of a cavity modified according to a first embodiment.

FIG. 2 shows a cavity 202 in the skin 102 constituting an example of a generating element 104a to be modified in the airflow 10. The cavity 202 has an upstream edge at which vortices are generated. These vortices impact on the downstream edge of the cavity 202 and, in order to modify the result of this impact, the downstream edge of the cavity 202 is modified in such a way as to exhibit a chamfer 204. Thus the increase in the size of the cavity 202 allows a lowering of the fundamental frequency of the signal emitted by the cavity 202 in order to become closer to the frequency of the masking element. Moreover, the vortices will impact on a downstream edge of gentler shape and the local deformation of the vortices at the downstream edge is weaker than on a protruding edge, which makes it possible to reduce the intensity of the whistling of the generating element 104a.

The modification step 810 thus consists of modifying the downstream edge of a cavity 202 by transforming a protruding edge into a chamfer 204.

Figure 3:
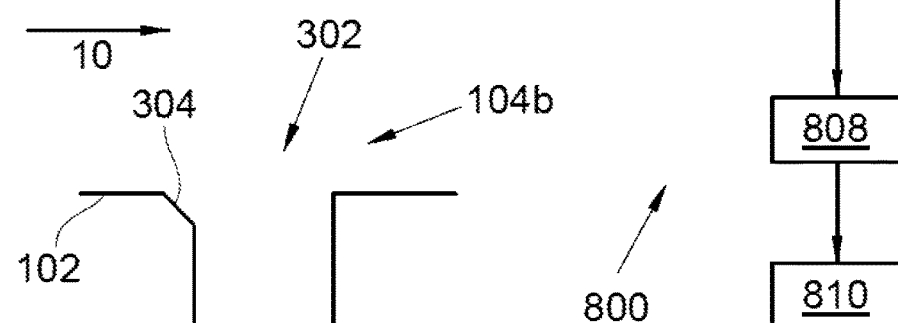
FIG. 3 shows the geometry of a cavity modified according to a second embodiment.

FIG. 3 shows a cavity 302 in the skin 102 constituting an example of a masking element 104b to be modified in the airflow 10. The cavity 302 has an upstream edge at which vortices are generated. These vortices impact on the downstream edge of the cavity 302 and, in order to modify the result of this impact, the upstream edge of the cavity 302 is modified in such a way as to exhibit a chamfer 304. Thus, the fundamental frequency of the sound signal emitted by the cavity 302 is lowered, because of the increase in the longitudinal length of the cavity 302, in such a way at to become situated below the frequency of the generating element. The upstream chamber 304 will increase the intensity of the whistling of the masking element 104b and favour the sound masking of the generating element.

The modification step 810 thus consists of modifying the upstream edge of a cavity 302 by transforming a protruding edge into a chamfer 304.

Such a modification then makes it possible to cover a sound signal with a higher fundamental frequency emitted by a generating element 104a.

In a particular embodiment, in the case of an aircraft 100, it is thus possible to modify the cavities of the axes of rotation of the elements of the landing gear of the aircraft 100 in order to mask the whistling of the FOPP (standing for "Fuel Over Pressure Protector" in English) cavities.

Figure 4:
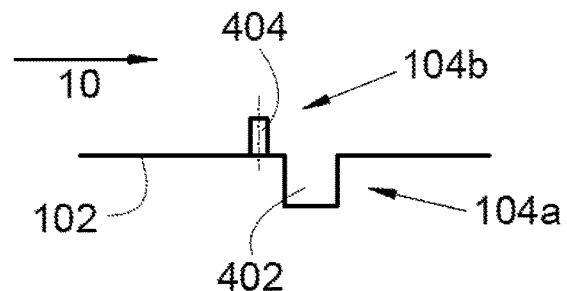
FIG. 4 shows the geometry of a cavity modified according to a third embodiment.

FIG. 4 shows an embodiment in which the masking element 104b to be modified is the area of the skin 102 which is in the vicinity of the generating element 104a and which here is for example a cavity 402. The masking element 104b takes the form of a bar 404 attached onto the area of the skin 102 in the vicinity of the cavity 402, in particular at a distance from the cavity 402 equal to a diameter of the bar 404 in order not to disturb the cavity 402 aerodynamically. The bar 404 is attached in such a way that its axis is perpendicular to the skin 102. The diameter of the bar 404 is calculated as a function of the frequency that it is desired to generate.

The modification step 810 thus consists of modifying an area of the skin 102 which is in the vicinity of the generating element 104a by attaching a bar 404 onto the said area.

Figure 5:
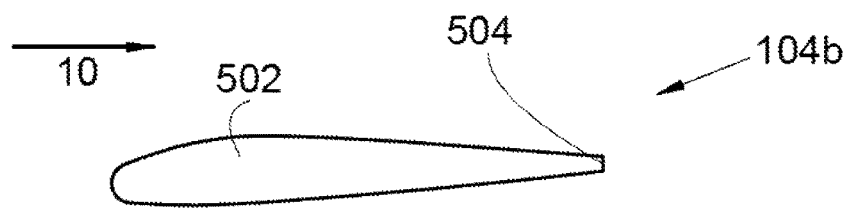
FIGS. 5 to 7 show side views of profiles of protruding elements according to different embodiments.
Figure 6:
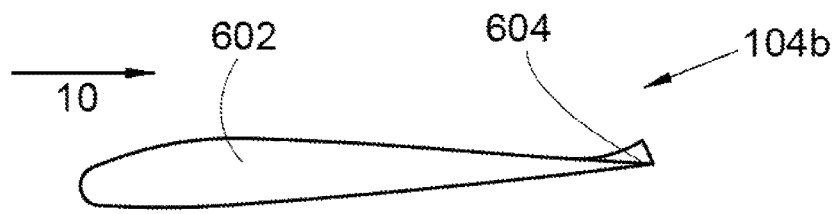
Figure 7:
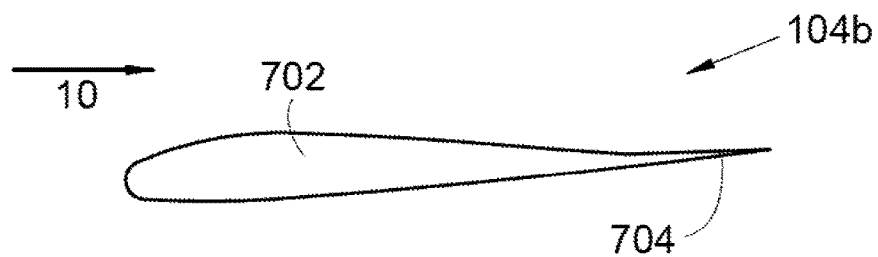

FIGS. 5 to 7 show different modifications which are applied to masking elements 502, 602, 702 which are in form of aerodynamic profiles such as for example antennas attached to the skin 102 in the vicinity of a generating element 104a whose sound signal must be masked.

In the embodiment shown in FIG. 5 the masking element 502 is truncated in order to obtain a whistling at a fundamental frequency lower than in the case of a profile that is not truncated. In fact, the truncated trailing edge 504 generates a vortex stream, which on becoming detached from the profile emits a whistling. The fundamental frequency of the whistling is related to the thickness of the trailing edge 504, where the thicker it is, the lower is the fundamental frequency.

The modification step 810 thus consists of truncating the trailing edge 504 of a masking element 502 in the form of a profile.

In the embodiment shown in FIG. 6, the trailing edge 604 of the masking element 602 is thickened in order to obtain a whistling at a fundamental frequency lower than in the case of a profile that is not thickened.

The modification step 810 thus consists of thickening the trailing edge 604 of a masking element 602 in the form of a profile.

In the embodiment shown in FIG. 7, the trailing edge 704 of the masking element 602 is lengthened and thinned in order to obtain a whistling whose fundamental frequency is higher than in the case of a profile that is not lengthened and not thinned.

The modification step 810 thus consists of lengthening and thinning the trailing edge 704 of a masking element 702 in the form of a profile.

The aircraft 100 according to the invention thus comprises a skin 102 in an airflow 10 and has a generating element 104a generating a sound signal because of the said airflow 10 and a masking element 104b generating another sound signal because of the said airflow 10, the said masking element 104b and the said generating element 104a being chosen and the structure of one or the other of them being modified by implementing the above masking method 800.

The various modifications also make it possible to harmonize all of the sound sources in order to have an agreeable rendering. Each modification is then designed to generate a sound frequency that is well defined, for example associated with a musical note, in such a way that all of the sound frequencies generated together form a musical chord.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A masking method comprising:
   a choice step during which a generating element is chosen, the generating element being part of a skin of an aircraft and being in an airflow and generating a first sound signal to be masked;
   a first measuring step during which a frequency meter measures a fundamental frequency of the sound signal emitted by the generating element because of the airflow;
   a selection step during which a masking element is selected from a plurality of possible masking elements, the masking element being part of the skin and being in the airflow and generating a second sound signal for masking the first sound signal generated by the generating element;
   a second measuring step during which a frequency meter measures a fundamental frequency of the second sound signal emitted by the masking element because of the airflow; and
   a modification step during which
      either a structure of the masking element is modified in such a way as to shift the fundamental frequency of the second sound signal emitted by the masking element to a frequency lower than the fundamental frequency of the first sound signal emitted by the generating element, or
      a structure of the generating element is modified in such a way as to shift the fundamental frequency of the first sound signal generated by the generating element to a frequency higher than the fundamental frequency of the second sound signal emitted by the masking element.

2. The masking method according to claim 1, wherein the generating element is a cavity and the modification step includes modifying a downstream edge of the cavity by transforming a protruding edge into a chamfer.

3. The masking method according to claim 1, wherein the masking element is a cavity and the modification step includes modifying an upstream edge of the cavity by transforming a protruding edge into a chamfer.

4. The masking method according to claim 1, wherein the masking element is an area of the skin in a vicinity of the generating element and the modification step includes attaching a bar onto the area.

5. The masking method according to claim 1, wherein the masking element takes a form of an aerodynamic profile and the modification step includes truncating a trailing edge of the masking element.

6. The masking method according to claim 1, wherein the masking element takes a form of an aerodynamic profile and the modification step includes thickening a trailing edge of the masking element.

7. The masking method according to claim 1, wherein the masking element takes a form of an aerodynamic profile and the modification step includes lengthening and thinning a trailing edge of the masking element.

8. An aircraft comprising:
   a skin in an airflow and having a generating element generating a first sound signal because of the airflow; and
   a masking element generating a second sound signal because of the airflow, the masking element and the generating element being chosen and the structure of one of the masking element and the generating element being modified by the implementation of the masking method according to claim 1.

* * * * *